United States Patent [19]

Drostholm

[11] 3,867,492
[45] Feb. 18, 1975

[54] METHOD OF MANUFACTURING OBJECTS CONTAINING A CAVITY FILLED WITH A RIGID FOAM OF POLYURETHANE

[76] Inventor: Hilmar Frede Drostholm, Gongehusvej 106, 2950 Vedbaek, Denmark

[22] Filed: June 23, 1971

[21] Appl. No.: 156,031

[30] Foreign Application Priority Data
June 24, 1970  Denmark.............................. 3276/70

[52] U.S. Cl..................... 264/46.6, 29/451, 156/71, 156/79, 156/293, 161/43, 161/161, 161/190, 264/134, 264/261, 264/263
[51] Int. Cl............................................. B29d 27/00
[58] Field of Search ........ 264/45, 321, DIG. 7, 134, 264/261, 263; 117/118, 102; 260/2.5 BD; 29/451; 156/71, 79, 293; 161/43, 161, 190

[56] References Cited
UNITED STATES PATENTS

| | | | |
|---|---|---|---|
| 2,921,866 | 1/1960 | Wilson............................ | 117/118 X |
| 3,114,722 | 12/1963 | Einhorn et al....................... | 260/2.5 |
| 3,246,443 | 4/1966 | Slemmons....................... | 161/43 UX |
| 3,260,618 | 7/1966 | Stark.................................... | 117/102 |
| 3,298,857 | 1/1967 | Terry.............................. | 112/118 X |
| 3,307,318 | 3/1967 | Bauman............................. | 161/43 X |
| 3,310,615 | 3/1967 | Bender................................ | 264/45 |
| 3,401,128 | 9/1968 | Terry................................ | 260/2.5 |
| 3,419,134 | 12/1968 | Fitts................................ | 264/45 UX |
| 3,503,177 | 3/1970 | Kropscott et al.................. | 264/45 X |
| 3,527,852 | 9/1970 | Thill..................................... | 264/45 |
| 3,546,841 | 12/1970 | Smith et al........................ | 264/45 X |
| 3,557,264 | 1/1971 | Getz et al. ............................ | 264/45 |
| 3,794,549 | 2/1974 | Schroteler............................ | 161/43 |

Primary Examiner—Philip E. Anderson

[57] ABSTRACT

Manufacture of aritcles containing a cavity filled with rigid polyurethane foam by locating in the cavity or in the place which is to become the cavity a flexible polyurethane foam impregnated with isocyanate and protected against moisture and then removing the protectric barrier so that moisture gains access to the polyurethane foam and causes it to expand and cure to a rigid foam.

8 Claims, No Drawings

METHOD OF MANUFACTURING OBJECTS CONTAINING A CAVITY FILLED WITH A RIGID FOAM OF POLYURETHANE

It is known to use rigid polyurethane foam as a lightweight building material with insulating properties, for example for house building, in the form of building blocks, in means of transport such as refrigerating trucks and ships, for furniture upholstering, safety upholstering, tightening fillets, packing and many other purposes in which the polyurethane foam is nearly always placed in the object involved in such manner that it may be said to be located in a cavity which is ether present beforehand or is produced owing to a desire to cover the surface of the polyurethane foam.

The known methods of producing such objects consist in filling the liquid polyurethane-forming constituents into the cavity and causing them to react under the influence of water and/or monofluoratrichloramethane as blowing agents which produce the foam by development of gases and force the material into every corner of the cavity. This method has serious drawbacks, among which reference should primarily be made to the inconveniences of working with and dosing liquid materials in addition to the fact that the foaming has to take place under pressure which may increase to many times that of the atmosphere, and in many cases where the objects containing the cavities are of insufficient mechanical strength is is therefore neccesary to brace them by means of molds. The known method has finally the drawback that the polyurethane foam produced is of very low adhesive power in relation some materials such as aluminum, glass and asbestos which are of interest in connection with building materials. The foaming is closed cavities further requires efficient tightness of the cavities.

These drawbacks are overcome by the present invention, and its esential feature is that in the cavity or at the place later converted into a cavity in the object there is provided a flexible polyurethane foam impregnated with an isocyanate and protected against moisture, the protective barrier or part of it being removed directly before or after the polyurethane foam is placed at the said location.

As a result, it will be very simple to manufacture objects containing rigid polyurethane foam in a cavity, since, in fact, the flexible polyurethane dfoams may be bent and compressed almost like a sponge and therefore are easy to introduce into existing cavities. When the flexible polyurethane foam impregnated with isocyanate after being placed in the cavity is exposed to the humidity of the air after removal of the protective barrier, the said foam will expand and harden to form a rigid polyurethane foam with a simultaneous addition of isocyanate to the cellular walls and a swelling and development of carbon dioxide by the reaction of the water with the free isocyanate groups.

The method involve an expansion in the volume of the polyurethane foam of the order of 35%, and by selecting the flexible polyurethane foam of adequate size it is possible to aavoid such high pressure in the cavity that special bracing means are required. It is furthermore unncessary that the cavities be tight. The rigid polyurethane foam produced by the method has further the advantage that it adheres more efficiently to many materials than polyurethane foam formed directly by reaction during foaming between poly-hydroxy compounds and isocyanates.

According to the invention a suitable way of performing the method is to provide the flexible polyurethane foam impregnated with isocyanate into the cavity or at the desired place by way of a shaped piece wrapped in a plastic foil which is subsequently broken so that the air and consequently humidity get access to the foam. This embodiment is in particular suitable for prefabrication, since the finished shaped flexible polyurethane foam units may be supplied in packings of plastic foil that may be adapted for breaking by having weakening lines or having embedded wires that may be torn out.

The protection of the flexible polyurethane foam impregnated by means of isocyanate may also be effected by extruding the foam with a surface film and closing the open ends of the extruded piece after its impregnation with isocyanate, or the whole surface of the flixble polyurethane foam may prior to its impregnation with isocyanate be sealed with a coating, or the flexible polyurethane foam may be molded with a closed surface.

According to the invention the flexible polyurethane foam is advantageously impregnated with isocyanate in such an amount that the ratio by weight of the two constituents is 1:1 and 1:2. Smaller amounts of isocyanate than corresponding to the ratio 1:1 will not give the desired hardening and expansion, and isocyanate in amounts greater than twice the amount of polyurethane foam affords no additional advantages since this may involve brittleness.

The impregnation may be effected simply by immersion of the flexible polyurethane foam into the isocyanate, or the isocyanate may be introduced into the foam by pressure or be sucked in by vacuum. The impregnation may be facilitated by mixing the isocyanate with a hologenated organic solvent as, for example, monapluaratrichlaramethane, also knwon as R.11. After the impregnation excess isocyanate may be removed by means of calendering or centrifuging.

The invention is further concerned with a polyurethane foam for use in the method. An essential feature of the said polyurethane foam is that it consists of a shaped flexible polyurethane foam impregnated with isocyanate and protected with a moisture impenetrable wrapper. Such a polyurethane foam is a useful semimanufacture readily manufactured in mass production in standard units for use e.g. on building sites and in series and mass production of objects containing an insulation of rigid polyurethane foam.

EXAMPLE 1

A box-shaped piece of flexible polyurethane foam of the quality used for upholstering and having a density of 40kg/m$^3$ is immersed into a bath consisting of a mixture of 2.4 and 2,6-toluenediisocyanate and subsequently centrifuged so that the amount of isocyanate absorbed is twice the weight of the foam, and it is then packed in a moisture-tight polyethylene film. The piece thus packed may then be placed in a wall structure and when the polyethylene film is broken, thereby giving access to the humidity of the air, or if water is added, there will be an exothermic reaction by which a part of the isocyanate evaporates and the polyurethane foam expands and hardens to form a rigid foam having a density of 65 kg/m$^3$.

EXAMPLE 2

A mat of flexible polyurethane foam with a density of 40 kg/m³ is immersed into a bath consisting of 2 parts of diphenylmethane-4.4'-diisocyanate and 1 part of R. 11 and subsequently squeezed between rollers so that the amount of impregnation mixture absorbed is twice the weight of the foam. The mat is then sealed in a humidity-tight plastic foil and placed on the outer shell of a hull. The inner shell of the hull is attached on top hereof and the plastic foil is subsequently torn to pieces and water is introduced into the foam material. The foam material will thereby harden and fill out the cavity between the two shells and thereby make the boat nonsinkable and heat-insulated. The density of the rigid polyurethane foam will be about 65 kg/m³.

What we claim is:

1. A method for manufacturing an object containing a cavity filled with a rigid polyurethane foam coonsisting essentially of placing a shaped piece of flexible open-celled polyurethane foam, impregnated with an organic isocyanate and having its surface protected against moisture by a moisture proof protective barrier, in a cavity of an object or in a location on said object subsequently enclosed to form a cavity, removing at least part of said barrier from said shaped piece directly before or after placement, and exposing said shaped piece to moisture whereby the flexible polyurethane foam of said shaped piece is converted into rigid polyurethane foam.

2. A method according to claim 1 wherein the isocyanate is a diisocyanate.

3. A method according to claim 1 wherein the weight ratio of foam to isocyanate is about 1:1 to about 1:2.

4. A method as in claim 1 wherein the isocyanate is a mixture of 2.4 and 2,6-toluenediisocyanate.

5. A method as in claim 1 wherein the isocyanate is diphenylmethane -4,4'-diisocyanate.

6. A method as in claim 1 wherein the flexible polyurethane foam has a density of 40 kg/m³.

7. A method as in claim 1 wherein said protective barrier is a moisture-proof wrapper.

8. A method as in claim 7 wherein the wrapper is a plastic foil.

* * * * *